US012372249B2

(12) United States Patent
Shen et al.

(10) Patent No.: US 12,372,249 B2
(45) Date of Patent: Jul. 29, 2025

(54) GLASS-CERAMIC COOKING APPARATUS AND A METHOD RELATING TO TEMPERATURE LIMITING CONTROL FOR PREVENTING COOKING OIL IGNITION

(71) Applicant: ZHEJIANG JIU KANG ELECTRIC APPLIANCES CO., LTD., Jiaxing (CN)

(72) Inventors: Chunlei Shen, Jiaxing (CN); Yun Bai, Beijing (CN)

(73) Assignee: ZHEJIANG JIU KANG ELECTRIC APPLIANCES CO., LTD., Jiaxing (CN)

( * ) Notice: Subject to any disclaimer, the term of this patent is extended or adjusted under 35 U.S.C. 154(b) by 982 days.

(21) Appl. No.: 17/480,877

(22) Filed: Sep. 21, 2021

(65) Prior Publication Data

US 2022/0003422 A1 Jan. 6, 2022

Related U.S. Application Data

(62) Division of application No. 16/003,148, filed on Jun. 8, 2018, now Pat. No. 11,143,413.

(Continued)

(51) Int. Cl.
*F24C 7/08* (2006.01)
*A62C 3/00* (2006.01)
(Continued)

(52) U.S. Cl.
CPC .............. *F24C 7/088* (2013.01); *A62C 3/006* (2013.01); *F24C 15/105* (2013.01);
(Continued)

(58) Field of Classification Search
CPC ... F16H 19/04; Y10T 74/18992; A62C 3/006; F24C 15/102; F24C 15/105;
(Continued)

(56) References Cited

U.S. PATENT DOCUMENTS 4,135,081 A * 1/1979 Fischer ................. F24C 15/105 219/512
4,414,465 A 11/1983 Newton et al.
(Continued)

FOREIGN PATENT DOCUMENTS

| | | | |
|---|---|---|---|
| DE | 20309503 | U1 | 8/2003 |
| EP | 0150087 | A1 | 7/1985 |
| GB | 2325533 | A | 11/1998 |

OTHER PUBLICATIONS

Entire patent prosecution history of U.S. Appl. No. 16/003,148, filed Jun. 8, 2018, entitled, "Glass-Ceramic Cooking Apparatus and a Method Relating to Temperature Limiting Control for Preventing Cooking Oil Ignition."

*Primary Examiner* — Steven W Crabb
*Assistant Examiner* — Ket D Dang
(74) *Attorney, Agent, or Firm* — NSIP Law

(57) ABSTRACT

A glass-ceramic cooking apparatus and a method relating to temperature limiting control of the glass heating area for preventing cooking oil ignition is disclosed. The apparatus comprises at least one glass surface, at least one heat source under the glass to create a heating area on the glass, one temperature sensor and one control unit for each heat source, wherein the sensor measures the temperature on the underside the glass heating area, and the control unit is electrically connected with the heat source, compares the measured glass temperature with predetermined upper and lower temperature limits that are based on a corresponding relationship between the heating area temperature and the cooking oil temperature within the cooking vessel, and then reduces or increases the output power of the heating source, so that the maximum temperature of the cooking oil in the cooking vessel can be limited in a range that is below the cooking oil ignition point while a minimum temperature can still be maintained for a desired cooking performance.

13 Claims, 9 Drawing Sheets

Related U.S. Application Data

(60) Provisional application No. 62/594,716, filed on Dec. 5, 2017.

(51) Int. Cl.
*F24C 15/10* (2006.01)
*H05B 1/02* (2006.01)
*H05B 3/74* (2006.01)

(52) U.S. Cl.
CPC ......... *F24C 15/106* (2013.01); *H05B 1/0266* (2013.01); *H05B 3/746* (2013.01); *H05B 2213/04* (2013.01)

(58) Field of Classification Search
CPC ........ F24C 15/106; F24C 7/083; F24C 7/088; H05B 1/0266; H05B 2213/04; H05B 3/746
USPC ........................................................ 219/412
See application file for complete search history.

(56) References Cited

U.S. PATENT DOCUMENTS

| | | | | | |
|---|---|---|---|---|---|
| 5,113,170 | A | 5/1992 | Goessler et al. | | |
| 5,628,242 | A | 5/1997 | Higley | | |
| 2003/0192873 | A1 | 10/2003 | Lerner | | |
| 2004/0195232 | A1 * | 10/2004 | Wilkins | ................. | H05B 3/746 219/448.13 |
| 2009/0014438 | A1 * | 1/2009 | Ohashi | ................... | H05B 6/062 219/627 |
| 2014/0048293 | A1 | 2/2014 | Luongo et al. | | |
| 2017/0339751 | A1 | 11/2017 | Meng et al. | | |
| 2018/0058700 | A1 | 3/2018 | Perry et al. | | |
| 2018/0135863 | A1 | 5/2018 | Ghelli et al. | | |

* cited by examiner

GLASS-CERAMIC COOKING APPARATUS AND A METHOD RELATING TO TEMPERATURE LIMITING CONTROL FOR PREVENTING COOKING OIL IGNITION

RELATED APPLICATIONS

This application is a Divisional Application of U.S. application Ser. No. 16/003,148, filed Jun. 8, 2018, which claims priority to U.S. Provisional Application No. 62/594,716, filed Dec. 5, 2017, the disclosures of which are incorporated herein by reference in their entirety for all purposes.

TECHNICAL FIELD

The disclosure herein relates to the field of glass-ceramic cooking apparatuses with temperature limiting control function, in particular, to a temperature limiting of the glass heating area to prevent cooking oil ignition during cooking while still maintain the minimum oil temperature required for a desired cooking performance.

BACKGROUND

In US and Canada, the leading cause of fires in kitchen is unattended cooking. When people are cooking food at homes, student domes, retirement homes, hotel suites with a kitchen and the like where, because of carelessness, forgetfulness, or lack of safe cooking training, the cooking vessel with cooking oil is left on the cooking apparatus's heating area unattended, and it is possible to cause a fire by the fact that the temperature of the heating area can rise as high as 650° C./1200° F., which is much higher than the ignition point of the cooking oil, typically 360° C./680° F. to 400° C./752° F.

Cooking fires and smoke cause a large amount of preventable death, personal injury and property damage each year. Therefore, preventing cooking oil fire is important for individuals, housing management companies, insurance companies, fire department, cooking apparatus manufacturers and government.

The potential safety issue of this problem has been recognized gradually. For example, starting from 2015, UL 858, UL Standard for Safety for Household Electric Ranges, requires an electric cooking apparatus using a coil heating element to pass UL858 60A, Coil Surface Unit Cooking Oil Ignition Test. According to UL858 60A testing requirements, a pan with cooking oil is placed on the coil surface and the apparatus should operate at the highest power setting for 30 minutes without the cooking oil ignition. This new safety requirement is currently applied to an electric cooking apparatus using a coil heating element only, and there are few solutions available for this type of cooking apparatus. However, cooking appliance manufacturers have not provided any effective solution for preventing the cooking oil ignition on the glass-ceramic cooking apparatus, and UL and other safety standards do not apply the cooking oil ignition requirement to the glass-ceramic cooking apparatus.

Out of every two units of electric cooking apparatuses sold in North America, there is a glass-ceramic cooking apparatus. The glass-ceramic cooking apparatus has the advantages of simple structure, low manufacturing cost, reliability, and is easy to maintain, hence it is widely used. The glass-ceramic cooking apparatus is internally provided with a standard temperature limiter connected in series with the heating source for limiting the temperature of the glass below 600° C./1112° F. to prevent any possible damage to components inside the apparatus or the glass surface caused by the excessive temperature, but the limiter cannot prevent the cooking oil ignition during cooking.

U.S. Pat. No. 7,307,246 to Smolenski provides a system for detecting temperature of a cooking utensil over a radiant cooktop. But, it does not provide a solution for preventing the cooking oil ignition during cooking while still maintaining the minimum cooking temperature for a desired cooking performance.

U.S. Pat. No. 9,132,302 to Luongo provides a sensing device and an algorithm for preventing cooking oil ignition on gas cooktop, cooktop with coil surface and glass-ceramic cooktop. But, it does not disclose details on how this system works on a glass-ceramic apparatus, such as the sensor placing and wiring, temperature limits setup, control cycle timing, etc. In addition, the algorithm limits the cooking vessel bottom temperature remains below the oil ignition temperature, which is not an effect way to prevent the cooking oil ignition while still maintain a desired cooking performance.

Prior devices such as that disclosed in the Luongo patent typically detect the temperature of the cookware based only on the temperature measured by the sensor under the glass, assume it is the real cooking oil temperature during cooking, and compare it with the cooking oil ignition temperature. However, there is a significant difference between the measured glass temperature and the real temperature of the cooking oil in the cooking vessel; the measurement is heavily affected by the temperature transfer model from under the glass to the cooking oil in the cooking vessel, the temperature sensor design, the placement of the temperature sensor (for example, whether there is a direct contact between the sensor and the underside of the glass, or if there is a gap between the sensor and the glass), the heating element type and output power, and the cooking vessel type. Without determining the relationship between the oil temperature within the cooking vessel and the temperature under the glass, the cooking oil temperature cannot be effectively controlled, and the minimum oil temperature for a desired cooking performance cannot be maintained. The present invention solves those problems.

Features that distinguish the present invention from the background art will be apparent from the following disclosure, drawings and description of the invention presented below.

SUMMARY

The invention provides a glass-ceramic cooking apparatus and a method relating to the glass heating area temperature limiting control, with which, the apparatus is capable of preventing the cooking oil ignition during cooking while still maintaining the minimum cooking temperature for a desired cooking performance. The apparatus comprises a glass surface for supporting and heating a cooking vessel, one or more heat elements under the glass with a temperature sensor and a control unit on each heating element. The sensor measures the glass heating area temperature and the control unit is electrically connected with the heating element for adjusting the output power of the heat element based on the measured glass heating area temperature and predetermined upper and lower temperature limits. The temperature of the glass heating area is controlled and limited to prevent ignition of cooking oil during cooking while still maintain a desired cooking performance.

To limit the temperature of the cooking oil below the ignition point, the real-time temperature of the cooking oil in the cooking vessel needs to be obtained by measuring the temperature of the glass heating area contacting with the cooking vessel.

Based on a large number of experiments, the temperature transfer model for the temperature transferring from the underside of the glass heating area to the cooking vessel, then to the cooking oil can be established, and the temperature of the cooking oil within the cooking vessel can be obtained with the experimental temperature transfer model and the measured heating area temperature. The upper and lower temperature limits are determined based on the experimental temperature transfer model, which takes into account the temperature sensor design, the placement of the temperature sensor (for example, direct contact the glass bottom or with a gap), the heating element type and output power, the cooking vessel type, the cooking oil temperature ignition point and cooking performance requirement.

When the temperature of the cooking oil in the cooking vessel approaches (but never reaches) the cooking oil ignition point, typically 360° C./680° F. to 400° C./752° F., the measured heating area temperature reaches the upper temperature limit, then the control unit reduces the output power of the heating element so that the maximum temperature of the cooking oil is limited below the oil ignition point; when the temperature of the cooking oil in the cooking vessel drops to the minimum cooking temperature for a desired cooking performance, and the measured heating area temperature reaches the lower temperature limit, the control unit increases the output power of the heating element, hence increases temperature of the cooking oil to maintain the minimum cooking temperature required by a desired cooking. Accordingly, a controlled cycle of the temperature of the cooking oil and the power change of the heating element is formed, and the maximum temperature of the cooking oil is limited in a range below the cooking oil ignition point, while the apparatus still maintains a desired cooking performance.

BRIEF DESCRIPTION OF FIGURES

The particular features and advantages of the invention as well as other objects will become apparent from the following description taken in connection with the accompanying drawings, in which.

DETAILED DESCRIPTION

Figure 1:
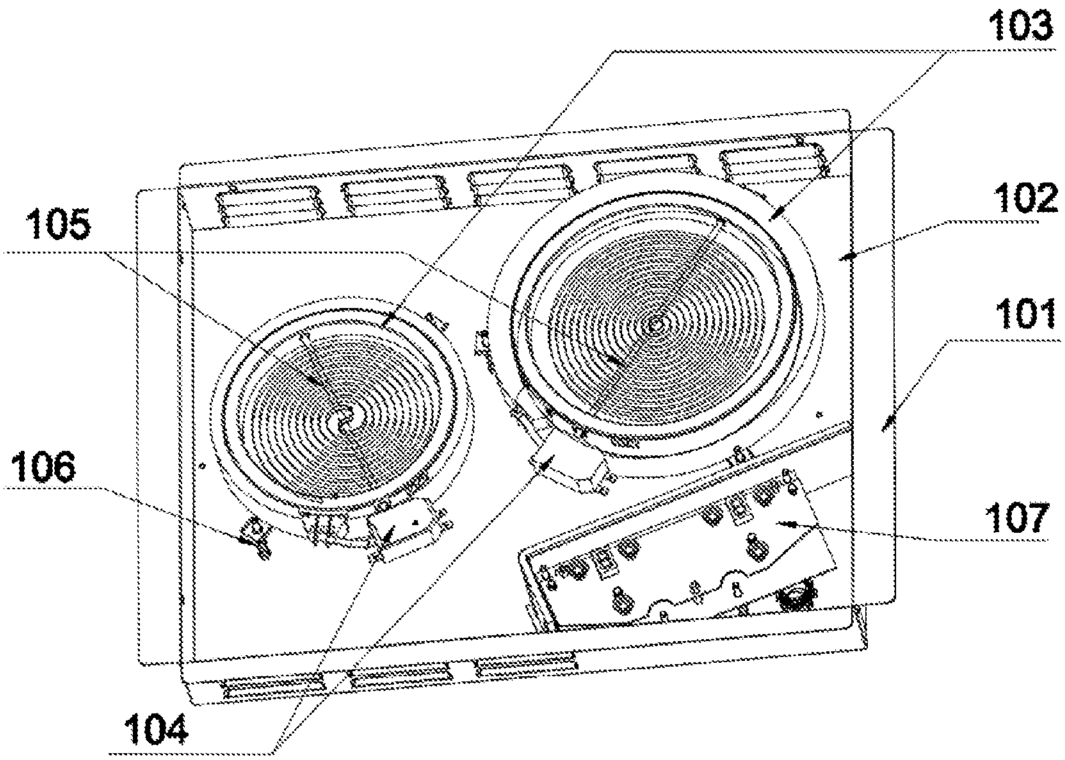
FIG. 1 is a perspective view of a glass-ceramic cooking apparatus with the glass surface removed

In one embodiment, as shown in FIG. 1 to FIG. 4, a two-heating elements glass-ceramic cooktop comprises a glass surface 201, two radiant heating elements 103 under the glass with a temperature limiter 104 on each heating element, and two heating areas 202. When the heating element turns on, heat transfers from the heating element to the underside of the heating area, then to the cooking vessel and the cooking oil in the vessel. In this embodiment, the temperature limiter comprises the temperature sensor and the control unit that is connected in series with the heating element. The temperature sensor 303 with a long tube 105 (for some large heating elements) or a short tube 401 (for some small heating elements) is made with expandable metal and is placed inside a multi-layer sleeve 301, which is formed by an inner thermal insulation layer, and an outer thermal insulation layer. The inner insulation layer and the outer insulation layer may be made of ceramic or glass or steel. A metal reflect coating is applied between two insulation layers. The length of the outer heat insulation layer is shorter than or equal to the inner heat insulation layer. With this specially designed sleeve, the sensor is able to detect the cooking vessel temperature through the underside of the glass heating area with minimum heat transfer from the heating element. The limiter's control unit 302 compares the measured temperature by the sensor with the predetermined upper and lower temperature limits, and then connects or disconnects the heating element power to control the cooking oil temperature in the cooking vessel.

The table below shows an example of the experimental temperature transfer model for this embodiment, wherein an expansion metal temperature sensor with a long tube, a steel inner insulation layer and a glass outer layer is placed cross the center of a 2300 W radiant heating element and 1.5 mm below the glass; a cast iron fry pan is used here; the minimum cooking temperature is defined as 250° C./482° F., which is the boiling point for most cooking oil; the temperature of the cooking oil in the cooking vessel is measured, and temperature limits of the temperature limiter are determined.

| Temperature measured by the sensor (° C.) | Temperature in the cooking oil (° C.) | Temperature limit (° C.) |
|---|---|---|
| 260 | 150 | |
| 324 | 245 | 330; Lower temperature limit |
| 400 | 285 | |
| 510 | 340 | 505; Upper temperature limit |

When the measured temperature reaches the upper temperature limit, 505° C./941° F., and whereby the temperature of the cooking oil approaches 340° C., the temperature limiter disconnects the power of the heating element and causes the heating element to stop generating heat; when the measured temperature of the sensor is close to the lower temperature limit, 330° C./626° F., the limiter connects the power of the heating element causing the heating element to generate heat. A controlled temperature cycle for the cooking oil in the cooking vessel is formed, and the maximum temperature of the cooking oil is limited below 340° C./644° F., which is below the cooking oil ignition point, typically 360° C./680° F. to 400° C./752° F. Changing the lower temperature limit will affect the timing of the controlled oil temperature cycle and the cooking temperature, which will meet different cooking performance requirements. For example, for users who prefer a high-temperature cooking, raising the lower temperature limit will shorten the controlled oil temperature cycle, and raise overall cooking temperature while still prevents the cooking oil ignition.

Figure 5:
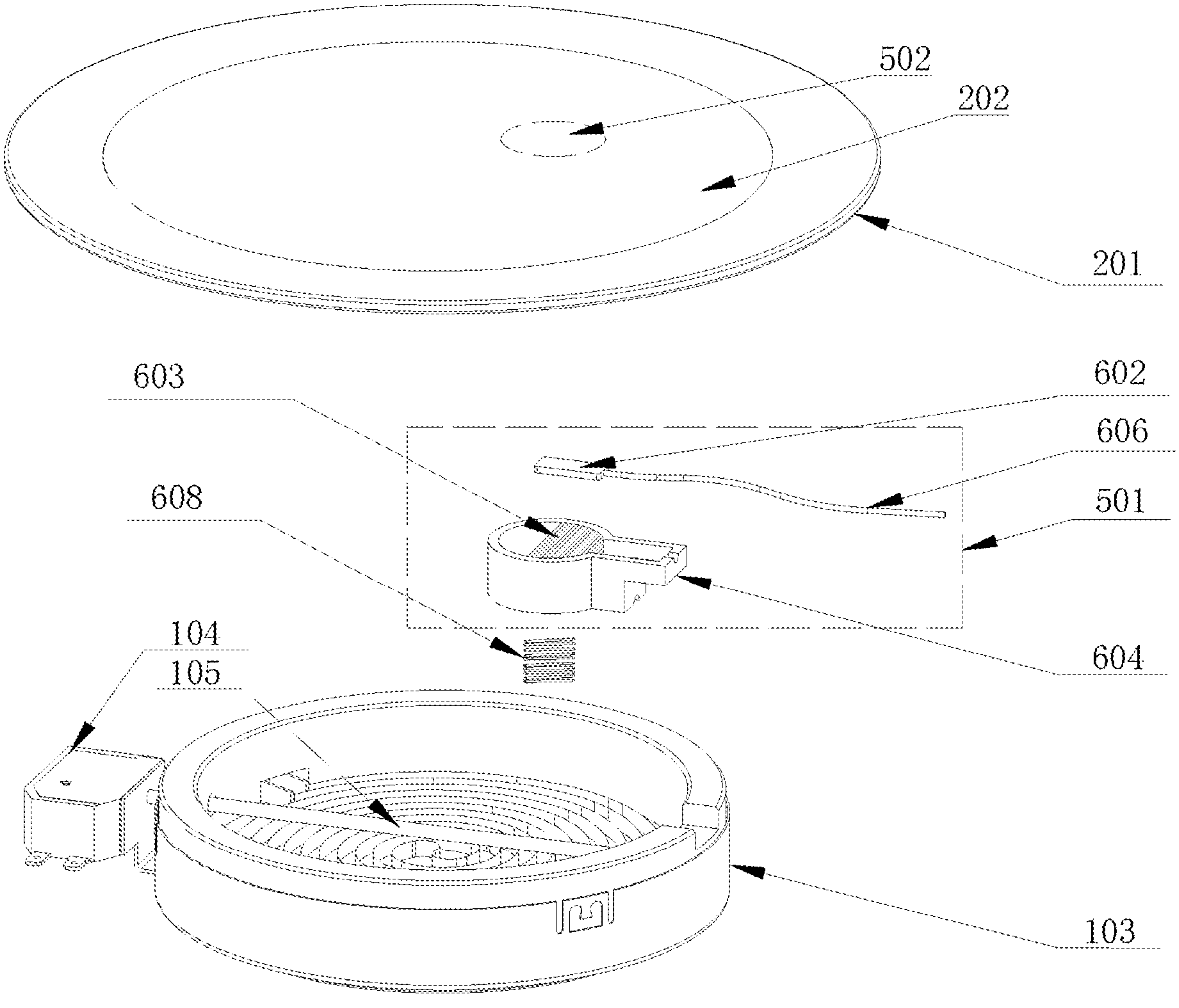
FIG. 5 is an exploded view of a part of a glass-ceramic cooking apparatus
Figure 6:
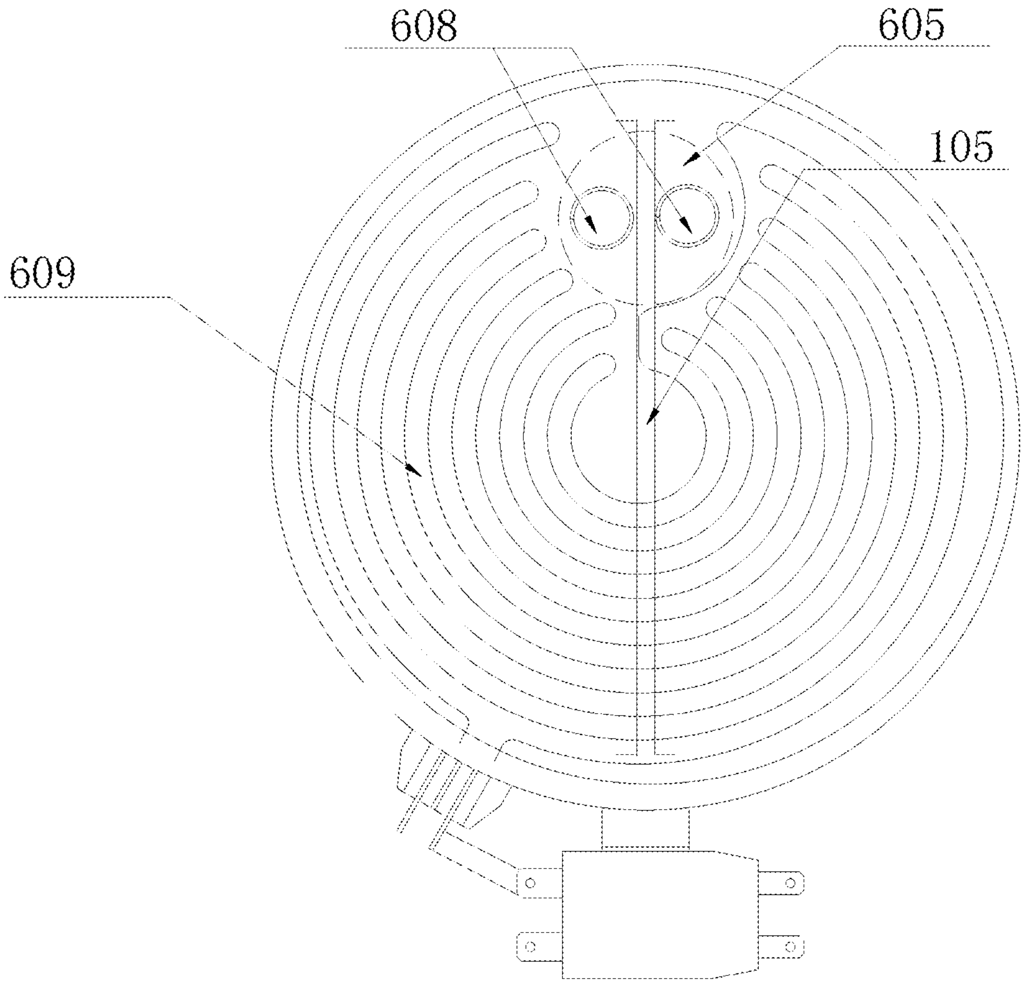
FIG. 6 is a vertical view of the heating element shown in FIG. 5.
Figure 7:
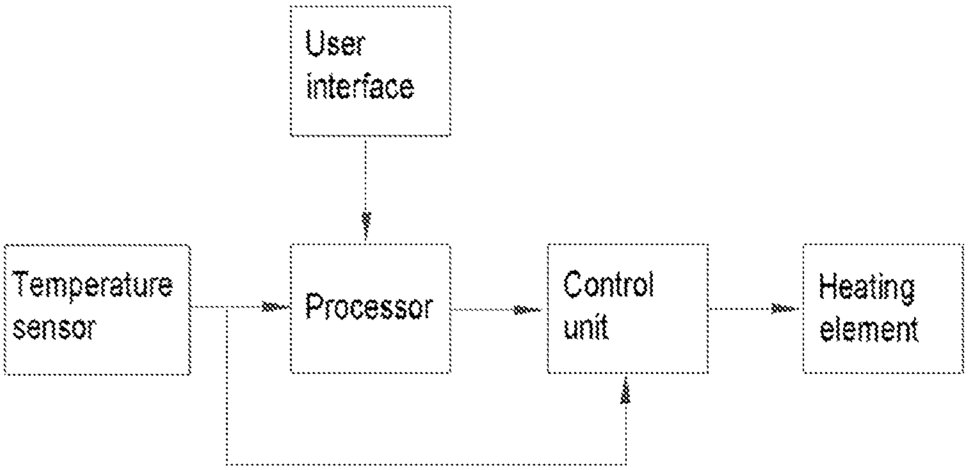
FIG. 7 is a flow chart illustrating the steps carried out by the control circuit of the apparatus shown in FIG. 5, and FIG. 6

In some embodiments, as shown in FIG. 5, FIG. 6, and FIG. 7, there is a two-heating elements glass-ceramic cooktop similar to that shown in FIG. 1 with a standard temperature limiter 104, but also includes a temperature sensor 501 and a control unit integrated in the cooktop's control circuit 107. The temperature sensor 501 may be mounted on the tube 105 of the temperature limiter 104, or a separate supporting tube. As shown in FIG. 5, the temperature sensor 501 has a temperature probe 602 surrounded by insulation material 603 that is compressed between the glass and the sensor's ceramic case 604. The temperature sensor is glued on the underside of the glass heating area 202 or is pushed against the glass by an elastic device such as a coil spring or a leaf spring 608. The insulation material surrounding the probe creates a heat insulation area, or cold area 502, on the heating area 202. Because the insulation material blocks the heat radiation from the heating element to the probe and the cold area, and glass-ceramic material is primarily radiative rather than conductive, the probe measures the cold area glass temperature, which has the main heat source transferring through the cold area glass from the cooking vessel sitting on the heating area. To further reduce the direct heat radiation from the heating element to the probe, the heating wire 609 is placed with an empty area, or a non-heating zone 605, right below the temperature sensor. The temperature sensor's output signal is sent through the heat resistant wires 606 to the control circuit 107 shown in FIG. 1.

FIG. 7 shows an example of the flow chart illustrating the steps carried out by the control circuit. The control unit compares predetermined upper and lower temperature limits with the measured glass temperature by the sensor, and then increases or reduces the power to the heating element to form a controlled temperature cycle. The maximum temperature of the cooking oil is limited below the cooking oil ignition point while a desired cooking performance still maintains.

The temperature probe in this embodiment may be one or multi fiber optic temperature sensors, resistance temperature sensors, thermocouples, high temperature thermistors, polymer-derived ceramics (PDC) sensors, or any kind of temperature detectors, which is placed, or are distributed if using multi devices, on the underside of the glass. The temperature probe may have an infrared coating applied on the probe surface to further improve the sensor performance.

The control unit in this embodiment may be a relay, a set of relays, or a silicon-controlled rectifier (SCR) to adjust the heating element output power.

The table below shows an example of the experimental temperature transfer model for this embodiment, wherein a polymer-derived ceramics (PDC) temperature probe with 0.1 mm infrared radiant coating applied on the probe surface contacting the glass is glued under the glass; the sensor is placed 35 mm away from the heating element center and surrounded by 10 mm ceramic fiber insulation layer; the control unit is a long-life DPST power relay; a 2300 W radiant heating element and a cast iron fry pan are used in this example; the minimum cooking temperature is defined as 265° C./509° F., which is higher than the cooking oil boiling point, but below the typical cooking oil smoking point; the temperature of the cooking oil in the cooking vessel is measured, and temperature limits of the control unit are determined.

| Temperature measured by the probe (° C.) | Temperature in the cooking oil (° C.) | Temperature limit (° C.) |
|---|---|---|
| 190 | 150 | |
| 318 | 265 | 325; Lower temperature limit |
| 325 | 285 | |
| 347 | 340 | 340; Upper temperature limit |

In this example, when the measured temperature of the probe reaches the upper temperature limit, 340° C./644° F., whereby the temperature of the cooking oil reaches 340° C., the control unit reduces the power of the heating element, causing the heating element to generate less heat; when the measured temperature of the sensor is close to the lower temperature limit, 325° C./617° F., the control unit increases the power of the heating element, causing the heating element to generate more heat. A controlled temperature cycle for the cooking oil in the cooking vessel is formed, and the maximum temperature of the cooking oil is limited below 340° C./644° F., which is below the cooking oil ignition point, while the apparatus still maintains the minimum cooking temperature, 265° C./509° F., for a desired cooking performance.

Figure 8:
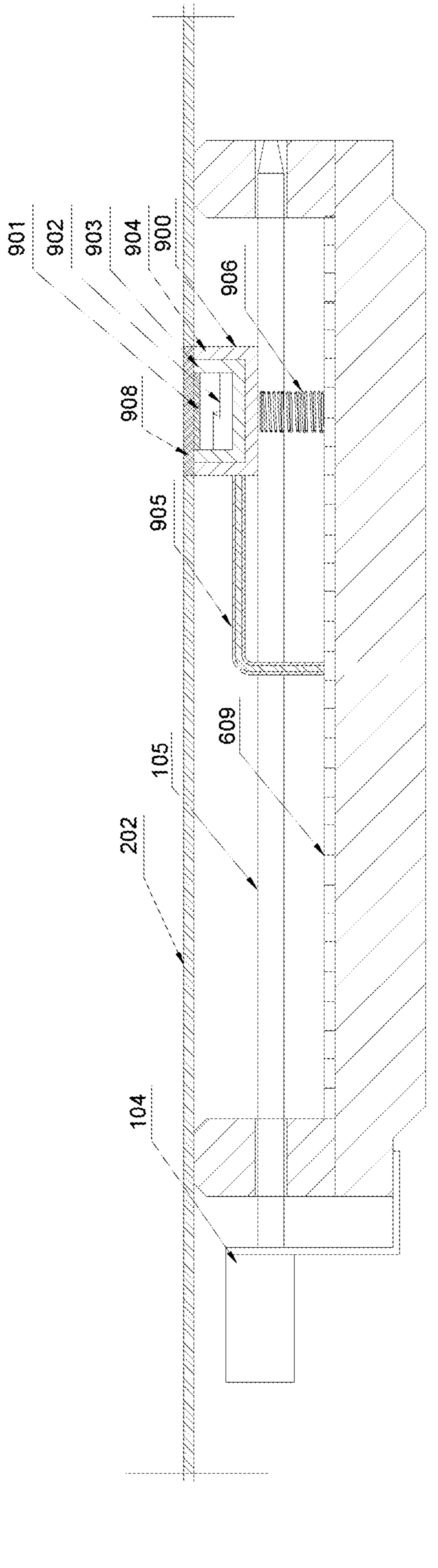
FIG. 8 is a cross-sectional view of a part of a glass-ceramic cooking apparatus, where a 2 in 1 temperature controller is mounted on one side of the heating element

In some embodiments, as shown in FIG. 8, there is a two-heating elements glass-ceramic cooktop similar to that shown in FIG. 1 with a standard temperature limiter 104, but also includes a 2-in-1 temperature controller 900, which integrates a temperature sensor 901 and a control unit 902 in a single device. The temperature controller is surrounded by the insulation layer 903 that is compressed to the glass by the ceramic case 904. The temperature controller may be mounted on the probe tube 105 of the temperature limiter 104 or a separate supporting tube. The controller is glued on the underside of the heating area 202 or is pushed against the glass by an elastic device such as a coil spring 906. The control unit is connected in series with the heating wire 609 through heat-resistant wire 905. The insulation material generates a heat insulation area, or cold area 908 in the heating area 202. The sensor contacting in direct with the glass measures the cold area glass temperature, which has the main heat source transferring through the cold area glass from the cooking vessel sitting on the heating area. To further reduce the direct heat radiation from the heating wire to the temperature controller, the heating wire 609 is placed with an empty area, or a non-heating zone right below the temperature controller. The control unit compares predetermined upper and lower temperature limits with the measured temperature by the sensor, and then connects or disconnects the power of the heating element, hence the maximum temperature of the cooking oil in the cooking vessel is limited and the minimum oil temperature for a desired cooking is maintained.

The table below shows an example of the experimental temperature transfer model for this embodiment, where the temperature controller is a disc bimetallic thermostat and is glued on the underside of the glass heating area and 30 mm away from the heating element center. A 10 mm ceramic fiber insulation layer is placed between the thermostat and its outer ceramic case. A 0.1 mm infrared coating is applied on the thermostat surface contacting the glass. A 2300 W radiant heating element and a cast iron fry pan are used in this example. The minimum cooking temperature is defined as 265° C./509° F., which is higher than the cooking oil boiling point, but below the typical cooking oil smoking point. The temperature of the cooking oil in the cooking vessel is measured, and temperature limits of the control unit are determined.

| Temperature measured by the thermostat (° C.) | Temperature in the cooking oil (° C.) | Temperature limit (° C.) |
|---|---|---|
| 200 | 150 | |
| 275 | 265 | 280; Lower temperature limit |
| 310 | 285 | |
| 380 | 340 | 375; Upper temperature limit |

In this example, when the measured temperature of the thermostat reaches the upper temperature limit, 375° C./7076° F., the thermostat disconnects the power of the heating element, causing the heating element to stop generating heat; when the measured temperature reaches the lower temperature limit, 280° C./536° F., the control unit connects the power of the heating element, causing the heating element to generate heat. A controlled temperature cycle for the cooking oil in the cooking vessel is formed, and the maximum temperature of the cooking oil is limited below 340° C./644° F., which is below the cooking oil ignition point, while the apparatus still maintains the minimum cooking temperature, 265° C./509° F., for a desired cooking performance.

Figure 9:
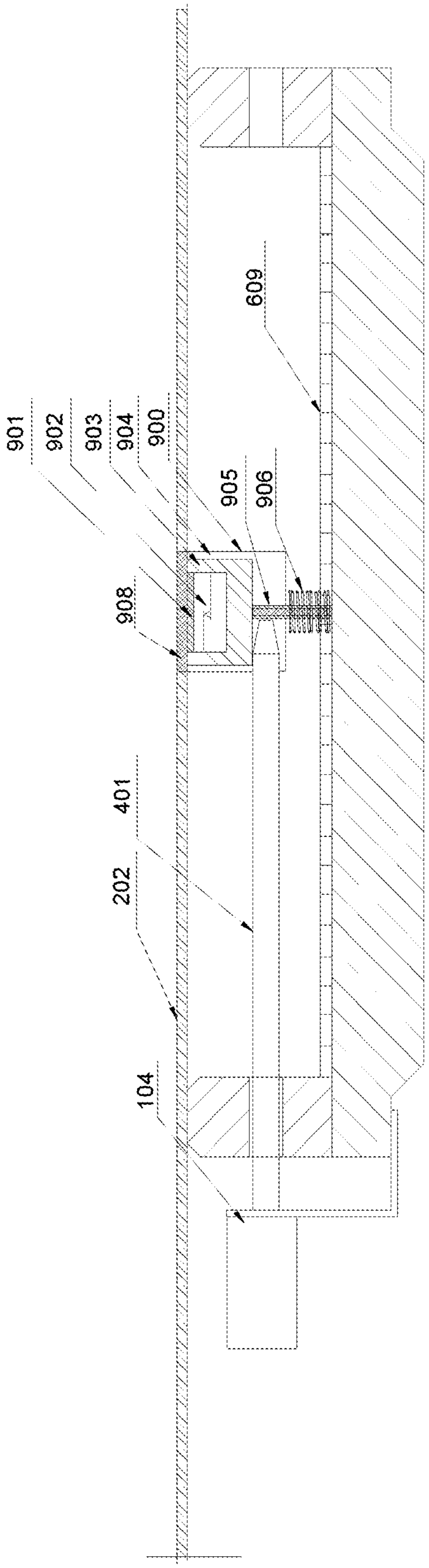
FIG. 9 is a cross-sectional view of a part of a glass-ceramic cooking apparatus, where a 2 in 1 temperature controller is mounted in the center area of the heating element

FIG. 9 shows another embodiment, which is similar to the embodiment shown in FIG. 8. But in this embodiment, the temperature controller 900 is placed in the center area of the heating element, and the temperature limiter's probe has a short tube 401.

The table below shows an example of the experimental temperature transfer model for this embodiment, where the temperature controller is a disc bimetallic thermostat and is glued on the underside of the heating area, and right below the center of the heating area. All other test conditions are the same as in the embodiment in FIG. 8

| Temperature measured by the thermostat (° C.) | Temperature in the cooking oil (° C.) | Temperature limit (° C.) |
|---|---|---|
| 200 | 150 | |
| 260 | 265 | 265; Lower temperature limit |
| 300 | 285 | |
| 340 | 340 | 335; Upper temperature limit |

In this example, when the measured temperature of the thermostat reaches the upper temperature limit, 335° C./635° F., the thermostat disconnects the power of the heating element causing the heating element to stop generating heat; when the measured temperature reaches the lower temperature limit, 265° C./509° F., the control unit connects the power of the heating element causing the heating element to generate heat. A controlled temperature cycle for the cooking oil in the cooking vessel is formed, and the maximum temperature of the cooking oil is limited below 340° C./644° F., which is below the cooking oil ignition point, while the apparatus still maintains the minimum cooking temperature, 265° C./509° F., for a desired cooking performance.

In some embodiments, the heating element of the glass-ceramic cooking apparatus has a rated output power between 500 W and 3500 W.

In some embodiments, the heating element of the glass-ceramic cooking apparatus may be a radiant heating element, an infrared halogen lamp, or an induction heating element.

In some embodiments, the glass-ceramic cooking apparatus may be a single or multi heating elements cooktop.

In some embodiments, the glass-ceramic cooking apparatus may be a free-standing range with at least 4 heating elements and an oven under the cooktop.

In some embodiments, with a narrower predetermined temperature limit range, the temperature controller or the control unit can shorten the controlled temperature cycle time, increase average cooking temperature, and the apparatus still be able to prevent the cooking oil ignition. For example, the apparatus can be configured to maintain 10-60 seconds cycle time, and keep a higher average cooking oil temperature, 300° C./572° F. to 330° C./626° F., thereby achieves a desired cooking performance for users requiring higher cooking temperature, while still prevents the cooking oil ignition.

Figure 2:
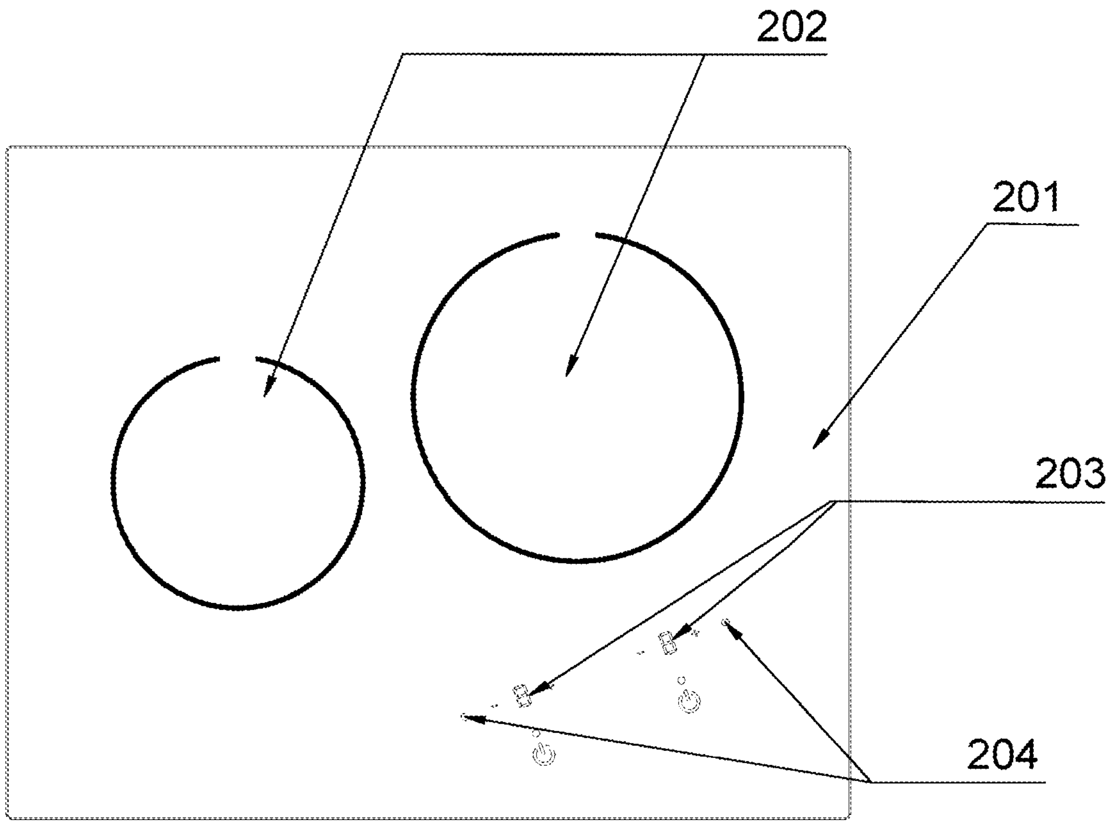
FIG. 2 is a vertical view of the glass surface of the glass-ceramic cooking apparatus shown in FIG. 1
Figure 3:
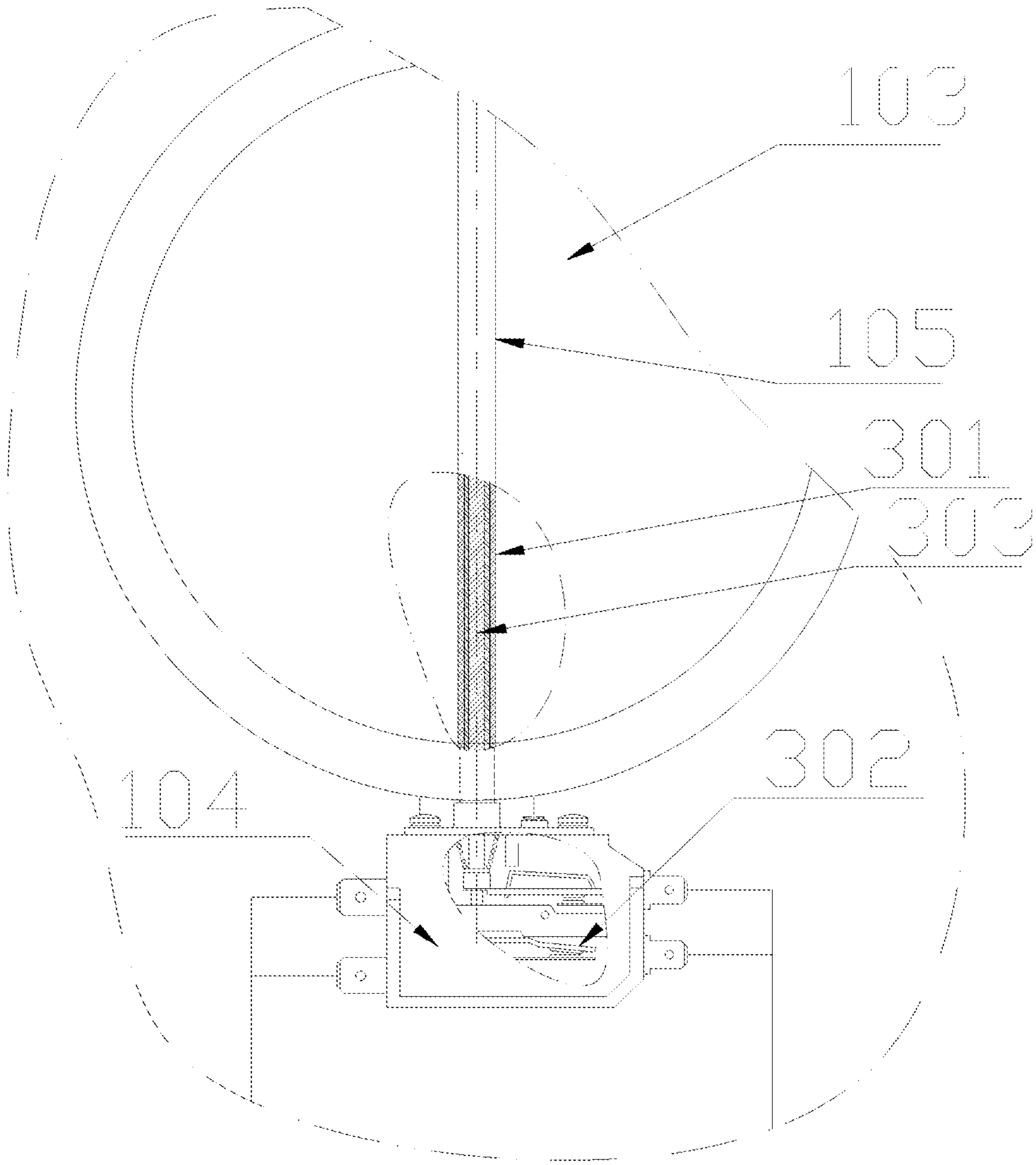
FIG. 3 is a vertical view of the heating element with a long-tube temperature limiter of the glass-ceramic cooking apparatus shown in FIG. 1, where the glass is partially removed
Figure 4:
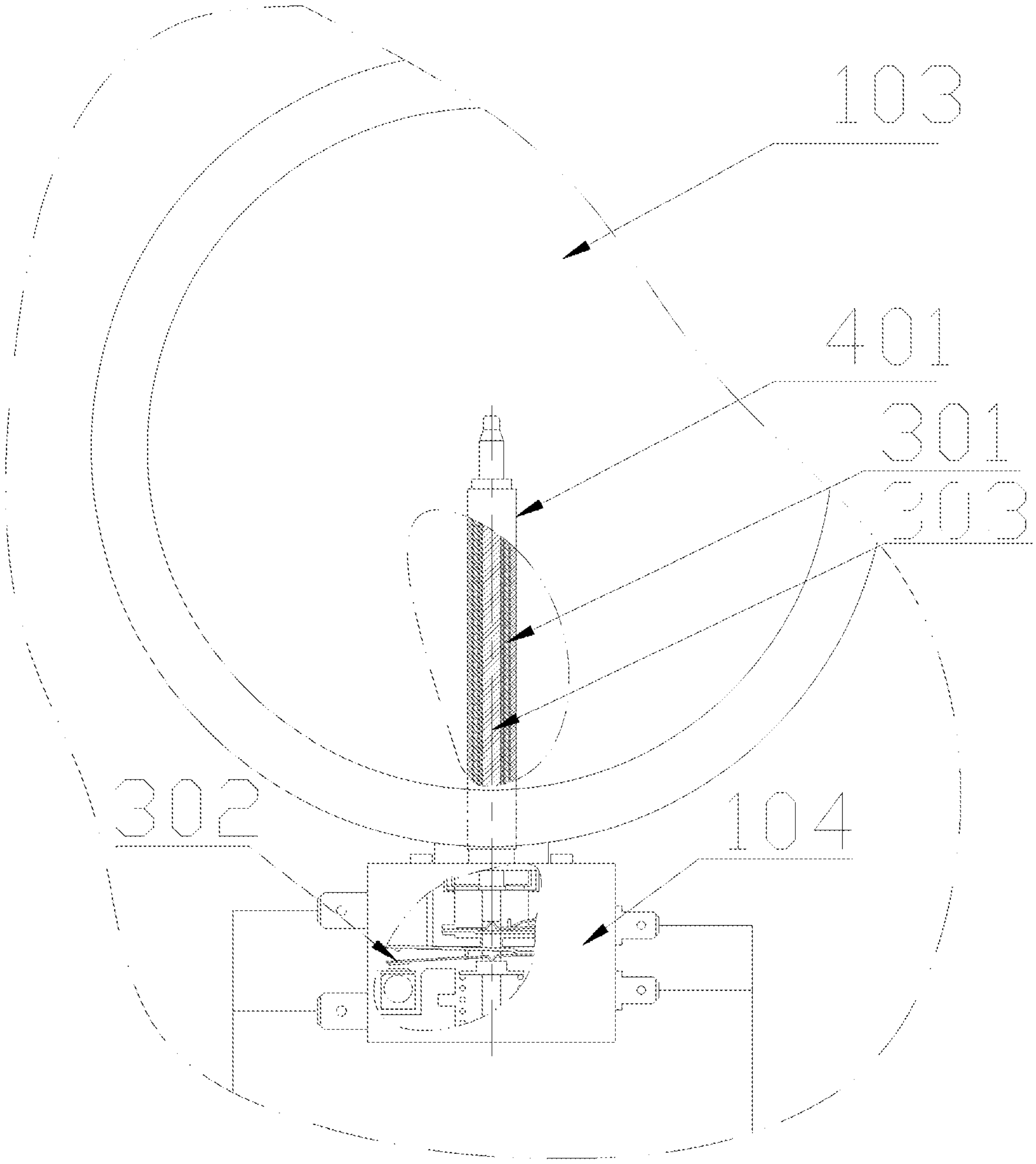
FIG. 4 is a vertical view of the heating element with a short-tube temperature limiter of the glass-ceramic cooking apparatus shown in FIG. 1, where the glass is partially removed

In some embodiments, the glass-ceramic cooking apparatus may include a hot surface indicator 204 shown in FIG. 2, which is controlled by the control circuit 107, to warn the user that the glass heating area is hot. The control circuit receives the measured temperature from a temperature sensor, which measures the temperature under the heating area, and then calculates the temperature of the heating area based on an experimental temperature transfer model. If the temperature of the heating area is higher than a pre-set point, for example 50° C./122° F.~60° C./140° F., the indicator is turned on until the heating area temperature is below the pre-set point, and then is turned off.

In some embodiments, the glass-ceramic cooking apparatus may include an automatic shutdown function. After a heating element is turned on, and the power selector 203 is set to the maximum power, if the power selector of any heating element is not changed within a pre-set period by the user, for example 60 minutes, the apparatus automatically turns off all heating elements; the pre-set period may be extended, for example 60 to 120 minutes if the power selector is set to a point between the minimum power and the maximum power.

A number of preferred embodiments have been fully described above with reference to the drawing figures. The scope of the claims should not be limited by the preferred embodiments and examples, but should be given the broadest interpretation consistent with the description as a whole.

What is claimed is:

1. A method of applying temperature limiting control of a heating area on a cooking apparatus to prevent cooking oil ignition during cooking while maintain a desired cooking performance; the method comprises:

a. testing to establish a relationship between a temperature of the heating area and a cooking oil temperature within a cooking vessel;

b. based on said relationship, setting up an upper temperature limit for controlling output power of a heating source to limit the cooking oil temperature below an oil ignition point, and setting up a lower temperature limit to maintain the cooking oil temperature for the desired cooking performance;

c. creating a heat insulated spot on the heating area;

blocking heat transferring from the heating source to the heat insulated spot;

making heat transferring from the cooking vessel placed on the heating area a main heat source to the heat insulated spot;

d. measuring a temperature of the heat insulated spot;

e. comparing the measured temperature with the upper and lower temperature limits; reducing the output power of the heating source as the measured temperature reaches the upper temperature limit; or increasing the output power of the heating source as the measured temperature reaches the lower temperature limit, wherein the temperature of the cooking of temperature is measured by a temperature sensor that includes a temperature probe, an insulation material and a ceramic casino, such that the temperature probe is enclosed in the ceramic casino, and surrounded by the insulation material;

wherein the insulation material is compressed to bring the temperature probe in direct contact with an underside surface of the heating source, thereby generating the heat insulated spot on the heating area to block the heat from the heating source to the temperature probe and the heat insulated spot, and wherein the temperature of the heating area is measured by the temperature probe of the temperature sensor based on the main heat source transferred from the cooking vessel through the heat insulated spot.

2. The method according to claim 1, wherein the temperature sensor is configured to thermally insulate the temperature probe from direct radiant heating by the heating source.

3. The method according to claim 1, wherein the temperature sensor is elastically urged against the underside surface of the heating source.

4. The method according to claim 1, wherein the heating source does not extend below the heat insulated spot of the heating area.

5. The method according to claim 1, wherein the temperature sensor comprises at least one additional probe distributed below the heating source.

6. The method according to claim 1, wherein the temperature sensor is selected from a group consisting of a fiber optic temperature sensor, a resistive temperature sensor, a thermistor, a polymer-derived ceramics (PDC) sensor, a thermocouple and combinations thereof.

7. The method according to claim 1, further comprising using a visual indicator to display a visual warning when the temperature of the heating area is above a predetermined temperature.

8. The method according to claim 1, further comprising using an automatic shutoff switch to shut off the heating source after the cooking apparatus is not manually operated for a predetermined period.

9. The method according to claim 1, wherein the heating source has a maximum power rating between 500 W and 3500 W.

10. The method according to claim 1, wherein the heating source is a radiant heating element, an infrared halogen lamp or an induction heating element.

11. The method according to claim 1, wherein the heating source includes a heating wire that is placed below the temperature sensor, such that a non-heating zone devoid of the heating wire and directly below the temperature sensor is provided to further reduce the heat radiation from the heating source to the temperature sensor.

12. The method according to claim 1, wherein the temperature sensor is a single device or multiple duplicated devices distributed on the underside surface of the heating source.

13. The method according to claim 1, wherein the temperature probe has an infrared coating in contact with the underside surface of the hearing source for improving measurement performance.

* * * * *